United States Patent
Schirle

[19]

[11] Patent Number: 6,072,661
[45] Date of Patent: Jun. 6, 2000

[54] THERMALLY CONDUCTIVE SPINDLE SUPPORT SHAFT

[75] Inventor: Neal Bertram Schirle, Morgan Hill, Calif.

[73] Assignee: International Business Machines Corporation, Armonk, N.Y.

[21] Appl. No.: 09/031,125

[22] Filed: Feb. 26, 1998

[51] Int. Cl.[7] .................................................. G11B 17/02
[52] U.S. Cl. ...................................................... 360/99.08
[58] Field of Search .............................. 360/98.07, 99.04, 360/99.08; 369/270; 310/67 R, 90

[56] References Cited

U.S. PATENT DOCUMENTS 4,735,923   4/1988   Sugawara et al. ........................ 501/89
5,850,329  12/1998   Sullivan ................................... 360/135

*Primary Examiner*—George J. Letscher
*Attorney, Agent, or Firm*—Robert B. Martin

[57] ABSTRACT

A highly thermally conductive spindle support shaft is composed of a metal matrix composite of aluminum (Al) and silicon carbide (SiC) of substantially 53% to 63% silicon carbide by volume. The spindle support shaft supports a magnetic disk file spindle by means of rotatable bearings, replacing a steel shaft. The spindle support shaft increases the heat transfer from, and reduces the temperature of, the rotatable bearing, and matches the coefficient of thermal expansion of a conventional steel shaft, thereby maintaining the bearing preload through a range of temperatures.

12 Claims, 3 Drawing Sheets

TEMPERATURE VS SHAFT CONDUCTIVITY

| SHAFT CONDUCTIVITY | 19.56 | 24.90 | 43.75 | 62.50 | 100.00 | (W/m)/K |
|---|---|---|---|---|---|---|
| DE TOP | 21.1 | 21.1 | 21.2 | 21.1 | 21.2 | °C |
| TOP BEARING | 34.9 | 32.2 | 27.7 | 26.0 | 24.5 | °C |
| MOTOR STATOR | 47.7 | 42.3 | 33.6 | 30.2 | 27.3 | °C |
| DE BOTTOM | 22.6 | 22.6 | 22.6 | 22.6 | 22.5 | °C |

THERMALLY CONDUCTIVE SPINDLE SUPPORT SHAFT

FIELD OF THE INVENTION

This invention relates to spindle support shafts for spindle motors, and, more particularly, to a spindle support shaft that is highly thermally conductive.

BACKGROUND OF THE INVENTION

Magnetic disk files provide primary data storage systems for computer systems. The data is recorded in concentric tracks of a magnetic disk in the form of magnetic transitions. The disks are mounted on a spindle and the information is accessed by an actuator which moves a magnetic transducer radially over the surface of the disk and aligns the transducer with the concentric tracks. The disk and spindle are mounted for rotation on a support shaft and the disks are rotated at high speeds by means of an electric motor.

Important requirements for magnetic disk files are quick access to data together with high data rates. A key to both is a high rotational speed. On average, it takes half a revolution of the disk for the desired data to reach the transducer after the actuator has positioned the transducer at the desired track. Thus, the higher the speed the disk rotates, the quicker the desired data can be accessed. Similarly, faster rotation of a disk causes more data to pass the transducer, increasing the data rate at the transducer.

Increased capacity is also important and has been accomplished by increasing both the data density per disk and the number of disks in a given space. The number of disks has been increased by packing the disks closer together.

The combination of higher spindle speeds and the increased number of disks has resulted in increasing the operating temperatures of high capacity, high performance disk drives. The increased heating comes from an increased torque requirement mostly due to the increased viscous dissipation of the disks, due to higher speed and the increased number of disks. The increased temperature has a compounding effect in that the increased temperature of the motor reduces the motor efficiency and increases resistivity, thereby increasing the temperature even further due to the increased winding resistive loss.

The increases in temperature lead to degraded spindle bearing reliability and reduced motor capability. The bearing reliability is reduced due to the increased chance of grease loss due to reduced viscosity. The motor capability is reduced not only because the torque constant is reduced when design speed is increased (due to the fixed voltage supply), but also because the increased temperatures lead to increased voltage drops across the resistive elements in the system, e.g., coil windings, transistors, etc. Specifically, the increased temperatures increase the resistance of the coil, so that there is increased voltage drop across the coil. Thus, the voltage available for voltage margin, or headroom, is reduced. In order to provide the voltage margin needed for speed control (headroom) an even lower motor torque constant may be required.

A solution to this problem is to reduce both the motor and bearing temperature by increasing the heat transfer out of the motor and to the base plate and cover where the heat can be removed by convective heat transfer. Spindle motor configurations which place the stator below or outside both bearings can greatly improve the heat sinking of motor heat losses into the base plate, but these designs compromise bearing span or bearing size constraints. Also, some of these designs do not allow support of the hub during a heat shrink installation of disk clamps. In addition, the motor volume in such designs may be compromised compared to the more traditional design with the stator between the bearings.

The traditional stator between the bearings design is optimal for efficiency and highest spindle pitch stiffness. However, a difficulty with this design with respect to heat transfer is that the shaft must typically be a martensitic steel which has a coefficient of thermal expansion (CTE) (compared to the CTE of the other parts of the spindle) such that the bearing preload can be adequately maintained through a range of temperatures. Although the stator is attached directly to the shaft allowing heat conduction through the shaft to the base plate, the conductivity of typical shaft steels is poor (about 25 (W/m)/K—watts per meter per degrees Kelvin).

A fiber reinforced metal has been disclosed for improving the heat conduction effect of a motor. In Japan patent application no. 61-151762, published Jan. 18, 1988, a motor shaft is designed using aluminum alloy reinforced with a SiC whisker. The whisker reinforcing is claimed to retain (or increase) strength while increasing heat conduction. However, although the shaft improves the heat conduction effect and maintains strength, the issue of matching coefficients of thermal expansion is not discussed. The use of whisker presents a material which is non-uniform in cross section and which therefore cannot match a coefficient of thermal expansion of a uniform material.

SUMMARY OF THE INVENTION

An object of the present invention is to provide a spindle support shaft of a material which will increase the heat transfer of the spindle support, while at the same time matching the CTE of a conventional steel support shaft.

A thermally conductive spindle support shaft is disclosed and a magnetic disk file is disclosed implementing the thermally conductive spindle support shaft. The thermally conductive spindle support shaft mounts a disk file spindle by means of a rotatable bearing. The spindle may have an axial insert in the hub to support the bearing. The spindle support shaft comprises a metal matrix composite of aluminum (Al) and silicon carbide (SiC). For one embodiment, the metal matrix composite includes substantially 53% to 63% silicon carbide by volume (depending on other process variables), and whose coefficient of thermal expansion (CTE) is substantially that of a conventional steel shaft. The silicon carbide component is preferably in powder form.

The resultant spindle support shaft increases the heat transfer from the motor stator, and reduces the temperature of the rotatable bearing and of the motor, and matches the CTE of the conventional steel shaft, thereby maintaining the bearing preload through a range of temperatures. Thus, the optimal stator between the bearings design may be used in high speed magnetic disk drives.

Other objects, features, and advantages of the present invention will be apparent from the accompanying drawings and from the detailed description below.

BRIEF DESCRIPTION OF THE DRAWINGS

The present invention is illustrated by way of example and not limitation in the figures by the accompanying drawings in which like references indicate similar elements and in which.

DETAILED DESCRIPTION OF THE INVENTION

Figures 1, 3:
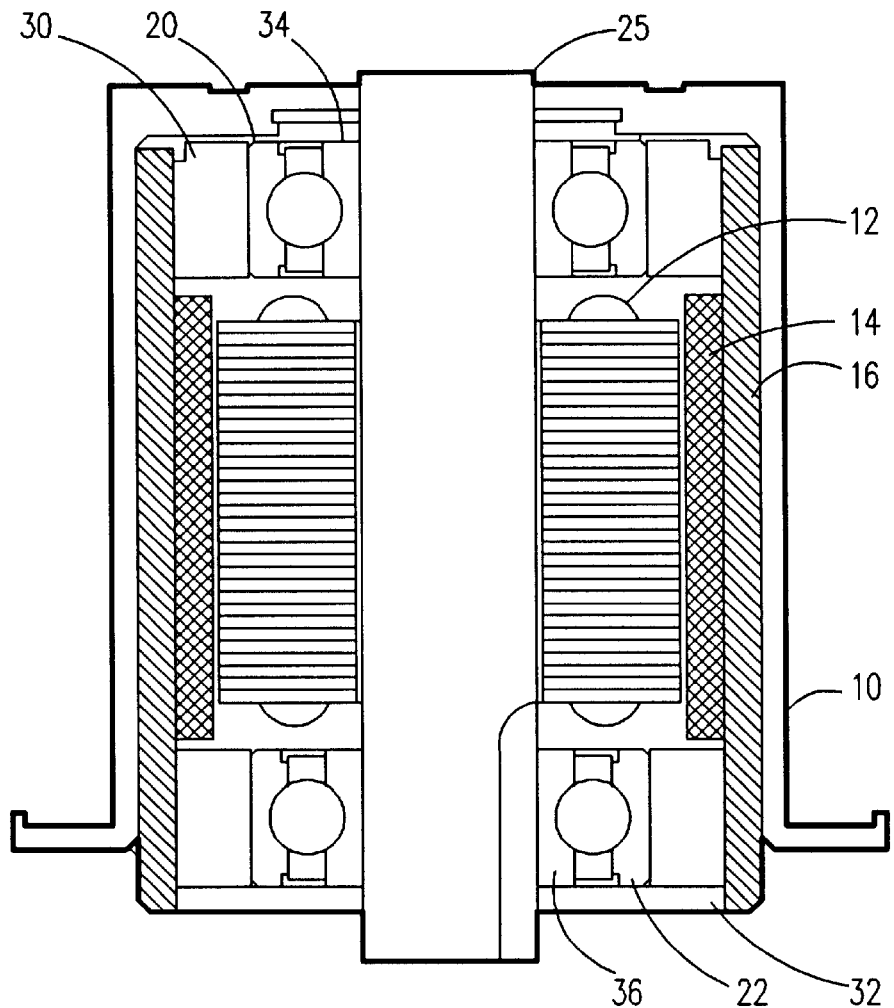
FIG. 1 is a cross sectional illustration of an embodiment of a spindle motor and support shaft of the present invention.
FIG. 3 is a table of temperature rise versus shaft conductivity for various thermal conductivities of spindle support shafts.

One embodiment of the present invention is illustrated in reference to FIG. 1. A spindle hub 10, which is typically made of aluminum, is arranged for mounting of at least one magnetic recording disk. A conventional "stator between the bearings" brushless DC spindle motor, comprising stator coils 12, rotor magnet 14 and rotor back iron 16, is arranged to rotate spindle hub 10, and is positioned between bearings 20 and 22. The bearings 20 and 22 mount spindle hub 10 on spindle support shaft 25 for rotation about the central axis of the spindle support shaft.

Rotor back iron 16 for the DC motor is a steel insert in the spindle hub 10, and provides a backing supporting the outer races 30 and 32, respectively, for bearings 20 and 22. Inner races 34 and 36 mount the bearings on the spindle support shaft 25. This traditional "stator between the bearings" design is optimal for efficiency and highest spindle pitch stiffness. The difficulty with the design is that the shaft has traditionally been made of martensitic stainless steel to achieve good hardness, good corrosion resistance, and tight diametric tolerance and to have a coefficient of thermal expansion (CTE) that achieves reasonable bearing preload stability through a range of operating temperatures.

As the speeds of magnetic disk drives are increased, the poor heat transfer characteristics of steel spindle support shafts, in addition to the increased heat load, has significantly increased motor and bearing temperatures, as described above. The higher temperatures cause reduced bearing reliability and inefficiency of the motor, which has a compounding effect in increasing the temperature of the motor, further reducing the motor's efficiency.

In one embodiment of the present invention, spindle support shaft 25 is arranged to increase the heat transfer characteristics of the spindle support shaft over conventional a steel shaft. Spindle support shaft 25 is made of a metal matrix composite of aluminum (Al) and silicon carbide (SiC), preferably in powder form, with substantially 53% to 63% silicon carbide by volume, and whose coefficient of thermal expansion (CTE) is substantially that of the conventional steel shaft. A typical steel for the shaft is a martensitic stainless steel such as AISI type 416, which has a CTE of 9.5*10$^{-6}$ m/m/degrees C.

Conventional motors often use martensitic steel shafts (e.g. type AISI 416 stainless steel) and often low carbon steel back iron. For such a motor using these materials, the CTE are such that a reasonable stability of bearing preload can be maintained over a range of operating temperatures. Maintaining bearing preload over a range of temperatures necessitates a selection of materials considering CTE as well as spindle motor bearing diameters and distance between bearings. Both radial and axial expansions must be considered. For the common current art system it is desired to maintain the CTE of the current shaft but increase the thermal conductivity.

Although an aluminum shaft would increase the thermal conductivity, it's CTE would be excessive, and due to it's softness it cannot achieve as tight a dimensional tolerance as steel. The 55% SiC material shown in table 1 achieves similar CTE as the shaft of conventional martensitic steel but increases the thermal conductivity by a factor of 7. The SiC component is preferably in powder form.

Further, a volumetric composition of 53% to 63% SiC allows a manufacturing process known as pressure infiltration casting (PIC). The PIC process starts with a SiC porous preform and heats this preform in a mold while introducing molten metal (in this case aluminum).

TABLE 1

| Comparisons of CTE and Thermal Conductivity | | |
|---|---|---|
| | SHAFT<br>AISI 416 | NEW SHAFT<br>AlSiC 55% |
| Conductivity (W/m)/K. | 25 | 185 |
| CTE (ppm/C.) | 9.5 | 9.5 |

The resultant spindle support shaft 25 increases the heat transfer from, and reduces the temperature of, the rotatable bearings 20 and 22 and of the motor, and has a CTE very close to the CTE of the steel shaft it replaces, thereby maintaining the preload of bearings 20 and 22 through a range of temperatures. Thus, the optimal stator between the bearings design may be used in high speed magnetic disk drives.

The resulting material of spindle support shaft 25 has a thermal conductivity of substantially 180 (W/m)/K (watts per meter per degrees Kelvin), approximately 7 times that of typical shaft steels (about 25 (W/m)/K). The spindle support shaft 25 is typically attached at the bottom to a base plate and at the top to a cover, and transfers the heat to the base plate and the top cover.

The CTE of an AlSiC metal matrix composite (MMC) is tailored by selecting a specific volume ratio of SiC to Al. The resulting CTE of an MMC can be predicted within a range by calculating upper and lower limiting values of CTE. The actual value of CTE can vary within the predicted upper and lower limits depending on process parameters. Good control of process parameters can produce good control on a specific CTE of the MMC. The upper and lower limiting values of CTE ($\alpha_{upper}$ and $\alpha_{lower}$, respectively) can be calculated knowing the volume fraction of SiC (V), the elastic modulus of the SiC ($E_s$) and Al ($E_A$), and the CTE of the SiC ($\alpha_s$) and Al ($\alpha_A$). The equations are as follows:

$$\alpha_{lower} = (1 - V^{1/3})\alpha_A + V^{1/3}\alpha_S + \frac{(1 - V^{1/3})(\alpha_A - \alpha_S)E_A V^{1/3}}{V^{2/3}E_s + (1 - V^{2/3})E_A}$$

$$\alpha_{upper} = \frac{\alpha_A(\alpha_A - \alpha_S)E_s V}{V^{2/3}E_s + (1 - V^{2/3})[E_s(1 - V^{2/3}) + E_A V^{1/3})]}.$$

See, B. Sonuparlak, C. Meyer, "Silicon Carbide Reinforced Aluminum for Performance Electronic Packages", Proceedings of the 1996 International Electronics Packaging Conference, 1996, pp 614–623.

Figure 2:
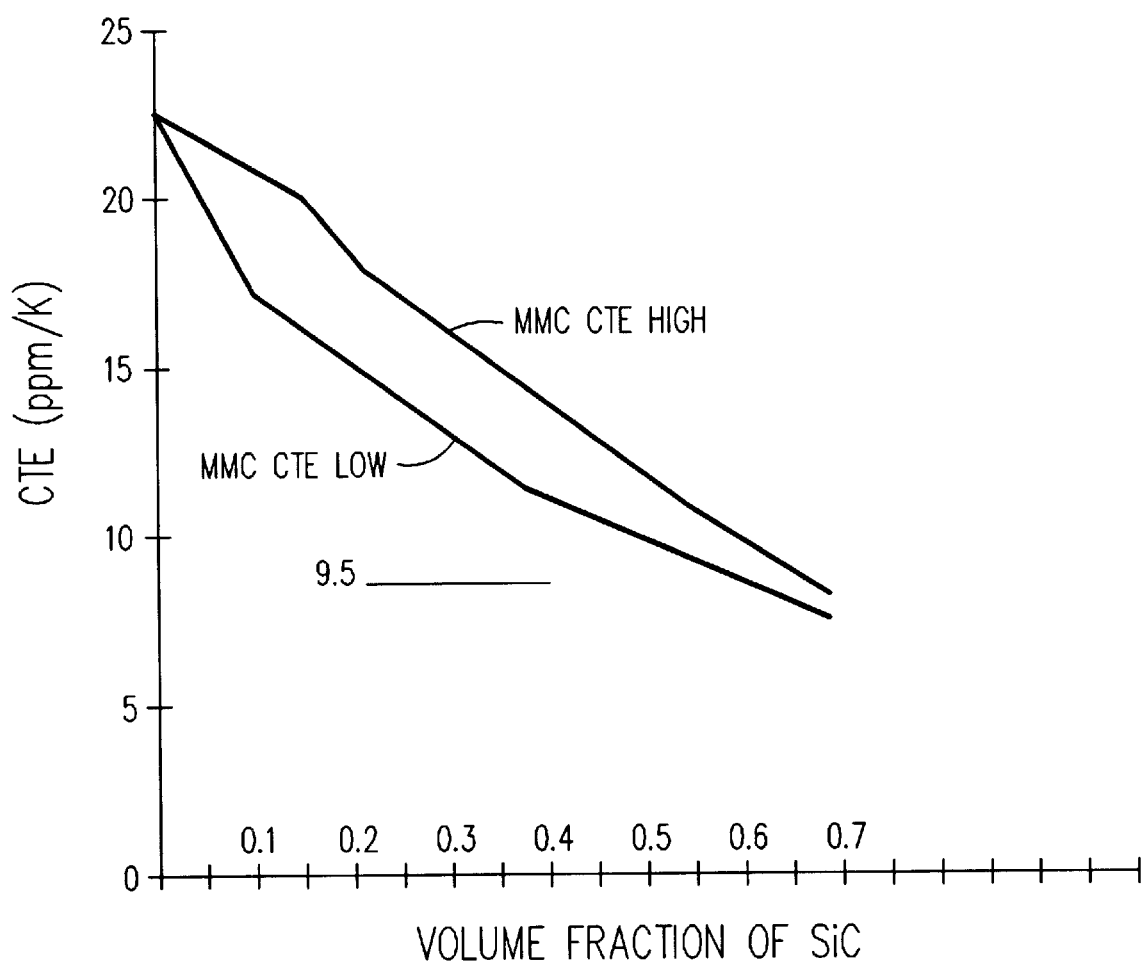
FIG. 2 illustrates graphs of CTE values of an AlSiC metal matrix composite.

Graphs of the upper and lower limiting values of CTE for various volume fractions of SiC are illustrated in FIG. 2.

FIG. 3 illustrates how increasing the heat transfer of the spindle support shaft by increasing the thermal conductivity of the solid shaft reduces the bearing temperatures. A typical 3.5 inch form factor 1.6 inch high magnetic disk drive was utilized for the test, having 5.8 Watts viscous dissipation of the disk stack, 2.3 Watts combined copper and iron loss for the motor, 0.25 Watts for each bearing, and 6.1 Watts on the electronics card. In the chart, note the drop in the top bearing temperature as the heat transfer is increased. The bearing temperatures are particularly important, in that for every 10 degrees C. reduction in bearing temperature, it's life is known to approximately double. The motor temperature is measured at the center of the stator. Also in the chart, "DE" is the device enclosure, and is measured at the top cover and at the bottom base plate. The device enclosure temperatures stay about the same as the heat is transferred outside the device enclosure, and the top bearing temperature drops over 10 degrees C. as the thermal conductivity of the spindle support shaft is increased, thereby increasing the heat transfer from the bearing to the device enclosure and then outside the device enclosure.

Figure 4:
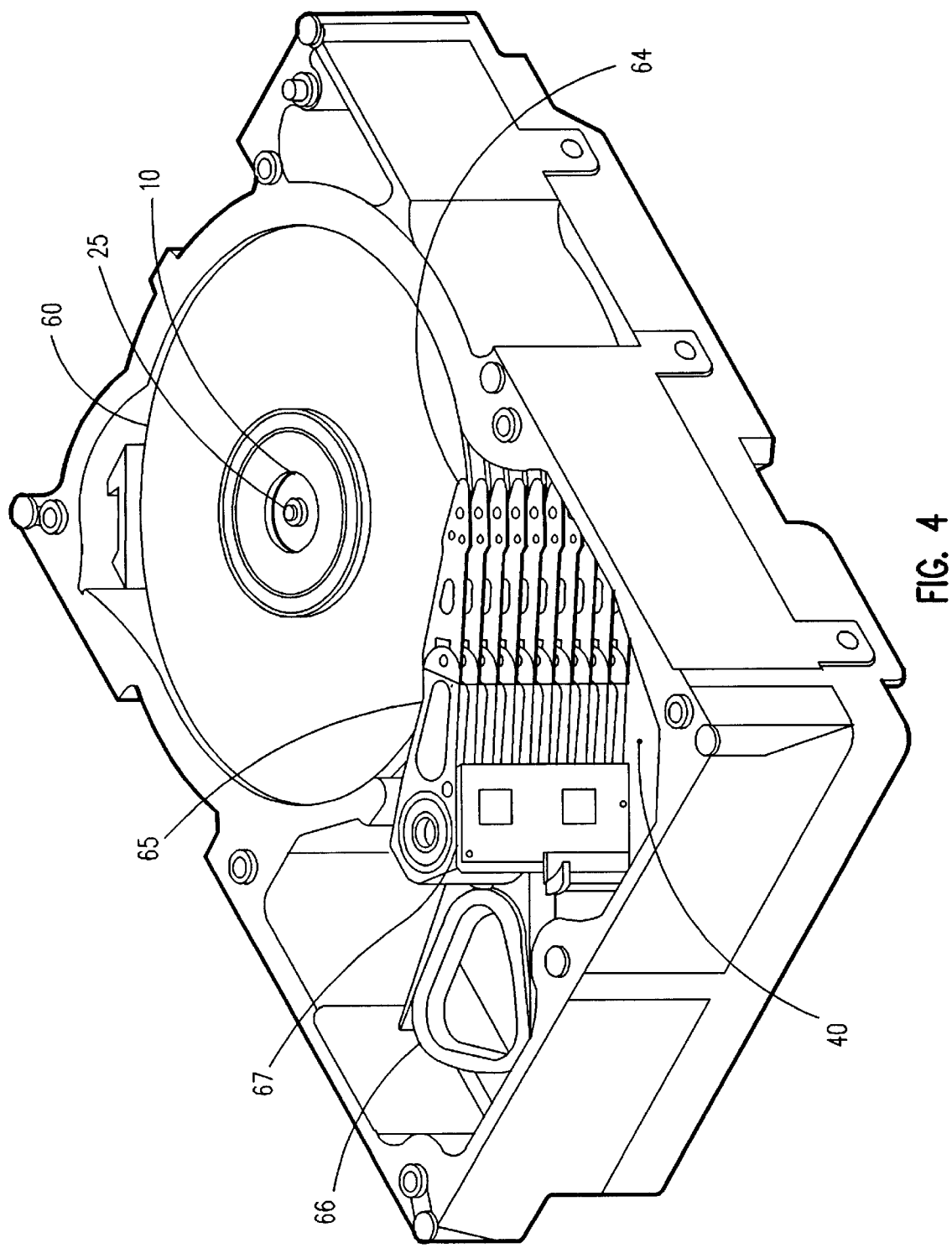
FIG. 4 is a top view representation of a magnetic disk drive employing the spindle support shaft of the present invention.

FIG. 4 illustrates an example of a magnetic disk drive in which the invention may be employed. At least one magnetic disk 60 is mounted on the spindle 10, having a plurality of concentric tracks for recording information. The spindle is mounted on spindle support shaft 25 for rotation about a central axis. As the disks are rotated by the motor, a transducer 64 mounted on the end of an actuator arm 65 is selectively positioned by a voice coil motor 66 rotating about pivot axis 67 to move the transducer 64 from track to track across the surface of the disk. The elements of the disk drive are mounted on base plate 40 in a housing 70 which is typically sealed to prevent contamination. The disks 60 are mounted on spindle 10 of FIG. 1 by bearings 20 and 22 and rotated by the motor about spindle support shaft 25 at a high rotational speed.

The spindle support shaft 25 may be mounted in the magnetic disk drive by any suitable means. A preferred method is by means of a press fit into the base plate 40 to better effect the heat transfer characteristics from the metal matrix composite spindle support shaft 25 to the base plate 40.

The illustrated spindle support shaft 25 is solid. However, a hollow, or partially hollow, shaft may also be utilized.

Although particularly advantageous for spindles for magnetic disk drives, the present invention may be advantageously employed for spindle motors used in a wide variety of applications.

While the preferred embodiments of the present invention have been illustrated in detail, it should be apparent that modifications and adaptations to those embodiments may occur to one skilled in the art without departing from the scope of the present invention as set forth in the following claims.

What is claimed is:

1. A thermally conductive spindle motor support shaft comprising:
    a metal matrix composite of aluminum (Al) and silicon carbide (SiC) of substantially 53% to 63% silicon carbide by volume, wherein said proportion of silicon carbide to aluminum is such that the coefficient of thermal expansion is substantially $9.5*10^{-6}$ m/m/ degrees C.

2. The thermally conductive spindle motor support shaft of claim 1, wherein said spindle support shaft is solid.

3. The thermally conductive spindle motor support shaft of claim 1, wherein at least an axial portion of said spindle support shaft is hollow.

4. A thermally conductive spindle motor support shaft comprising:
    a metal matrix composite of aluminum (Al) and silicon carbide (SiC) of substantially 53% to 63% silicon carbide by volume, wherein said silicon carbide component is in powder form and said proportion of silicon carbide to aluminum is such that the coefficient of thermal expansion is substantially the same as a martensitic stainless steel.

5. A spindle motor assembly for a magnetic disk file comprising:
    a spindle positioned to support at least one magnetic disk, said spindle having a rotor hub mounting an outer race of at least one rotatable bearing;
    a motor for rotating said spindle; and
    a thermally conductive spindle support shaft mounting an inner race of said at least one rotatable bearing, said spindle support shaft comprising a metal matrix composite of aluminum (Al) and silicon carbide (SiC) of substantially 53% to 63% silicon carbide by volume, wherein said spindle support shaft proportion of silicon carbide to aluminum is such that the coefficient of thermal expansion is substantially $9.5*10^{-5}$ m/m/ degrees C.

6. The spindle motor assembly of claim 5, wherein said spindle support shaft is solid.

7. The spindle motor assembly of claim 5, wherein at least an axial portion of said spindle support shaft is hollow.

8. A spindle motor assembly for a magnetic disk file comprising:
    a spindle positioned to support at least one magnetic disk, said spindle having a rotor hub mounting an outer race of at least one rotatable bearing;
    a motor for rotating said spindle; and
    a thermally conductive spindle support shaft mounting an inner race of said at least one rotatable bearing, said spindle support shaft comprising a metal matrix composite of aluminum (Al) and silicon carbide (SiC) of substantially 53% to 63% silicon carbide by volume, wherein said spindle support shaft silicon carbide component is in powder form and said proportion of silicon carbide to aluminum is such that the coefficient of thermal expansion is substantially the same as a martensitic stainless steel.

9. A magnetic disk file comprising:
    a base plate;
    at least one magnetic disk;
    at least one transducer;
    a spindle positioned to support said at least one magnetic disk, said spindle having a rotor hub mounting an outer race of at least one rotatable bearing;
    a motor for rotating said spindle;
    an actuator supported by said base plate, said actuator supporting said at least one transducer in read and\or write relationship with said at least one disk and selectively positioning said at least one transducer across said at least one disk; and
    a thermally conductive spindle support shaft mounting an inner race of said at least one rotatable bearing, said spindle support shaft comprising a metal matrix composite of aluminum (Al) and silicon carbide (SiC) of substantially 53% to 63% silicon carbide by volume, wherein said spindle support shaft proportion of silicon carbide to aluminum is such that the coefficient of thermal expansion is substantially $9.5*10^{-6}$ m/m/ degrees C.

10. The magnetic disk file of claim 9, wherein said spindle support shaft is solid.

11. The magnetic disk file of claim 9, wherein at least an axial portion of said spindle support shaft is hollow.

12. A magnetic disk file comprising:

a base plate;

at least one magnetic disk;

at least one transducer;

a spindle positioned to support said at least one magnetic disk, said spindle having a rotor hub mounting an outer race of at least one rotatable bearing;

a motor for rotating said spindle;

an actuator supported by said base plate, said actuator supporting said at least one transducer in read and\or write relationship with said at least one disk and selectively positioning said at least one transducer across said at least one disk; and a thermally conductive spindle support shaft mounting an inner race of said at least one rotatable bearing, said spindle support shaft comprising a metal matrix composite of aluminum (Al) and silicon carbide (SiC) of substantially 53% to 63% silicon carbide by volume, wherein said spindle support shaft silicon carbide component is in powder form and said proportion of silicon carbide to aluminum is such that the coefficient of thermal expansion is substantially the same as a martensitic stainless steel.

* * * * *